(12) United States Patent
Bukhary et al.

(10) Patent No.: US 10,945,816 B1
(45) Date of Patent: Mar. 16, 2021

(54) ORTHODONTIC BRACKET POSITIONING INSTRUMENT

(71) Applicant: KING SAUD UNIVERSITY, Riyadh (SA)

(72) Inventors: Ferdous Mohammed Taher Mulla Akram Bukhary, Riyadh (SA); Mohammed Taher Mulla Akram Qari Bukhary, Riyadh (SA); Sahar Faisal Sharaf Albarakati, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/924,090

(22) Filed: Jul. 8, 2020

(51) Int. Cl.
*A61C 7/14* (2006.01)
(52) U.S. Cl.
CPC .................. *A61C 7/146* (2013.01)
(58) Field of Classification Search
CPC .... A61C 7/02; A61C 7/12; A61C 7/14; A61C 7/146
See application file for complete search history.

(56) References Cited

U.S. PATENT DOCUMENTS

| | | | |
|---|---|---|---|
| 3,521,355 A | 7/1970 | Pearlman | |
| 5,487,660 A | 1/1996 | Good | |
| 5,542,842 A * | 8/1996 | Andreiko | A61C 7/00 433/3 |
| 5,607,299 A * | 3/1997 | Nicholson | A61C 7/14 433/3 |
| 5,711,665 A * | 1/1998 | Adam | A61C 19/004 433/9 |
| 6,290,495 B1 | 9/2001 | Jabri | |
| 6,296,482 B1 | 10/2001 | Kapit | |
| 7,726,968 B2 | 6/2010 | Raby et al. | |
| 9,872,744 B2 | 1/2018 | Bukhary et al. | |
| 2003/0215767 A1 | 11/2003 | Taub et al. | |
| 2004/0005523 A1 | 1/2004 | Kapit | |
| 2004/0048221 A1 | 3/2004 | Jabri | |
| 2004/0081935 A1 | 4/2004 | Stockstill | |
| 2005/0277082 A1 * | 12/2005 | Christoff | A61C 7/146 433/8 |
| 2010/0178629 A1 * | 7/2010 | Oda | A61C 7/125 433/14 |
| 2011/0250556 A1 | 10/2011 | Heiser | |
| 2013/0230817 A1 | 9/2013 | Kabbani | |
| 2016/0302888 A1 | 10/2016 | Garcia et al. | |
| 2019/0090986 A1 | 3/2019 | Schnaitter et al. | |

* cited by examiner

*Primary Examiner* — Heidi M Eide
(74) *Attorney, Agent, or Firm* — Nath, Goldberg & Meyer; Richard C. Litman

(57) ABSTRACT

The orthodontic bracket positioning instrument is designed to engage an orthodontic bracket for precisely positioning a center of an orthodontic bracket on a center of the crown while maintaining an open visual field of the bracket and relevant structures of the tooth. The positioning instrument includes a key that is configured to mate with a receiving aperture formed in the bracket. A proximal side of the key is supported by a base that extends along a length of the key. An alignment notch is defined within a proximal side of the base to indicate the center of the bracket, as well as the horizontal axis of the bracket. A handle extends from the proximal side of the base. The handle may extend from the base at an angle to provide a clear line of sight to the base, the bracket, and supporting tooth.

6 Claims, 4 Drawing Sheets

ORTHODONTIC BRACKET POSITIONING INSTRUMENT

BACKGROUND

1. Field

The present disclosure relates to orthodontic bracket positioning devices, and in particular, to an orthodontic bracket positioning instrument for mating with an orthodontic bracket to precisely position the bracket at a center of a clinical crown.

2. Description of the Related Art

An orthodontic bracket is a small device that is bonded to the tooth at a specific location, usually at the center of a clinical crown. Anatomically, the labial surface of the tooth is a convex surface and the center is the point of greatest convexity at the facial or labial surface of the crown. The center of the clinical crown is identified as the junction point of the vertical ridge line and the horizontal line between the mesial and distal contact point of each crown. The vertical ridge extends from the tip of the crown to the cement-enamel junction at the gingiva, dividing the labial surface of the crown into two halves. The horizontal line runs from the mesial contact point (contact point of the tooth with the adjacent tooth) to the distal contact point, and divides the crown into upper incisal half and lower gingival half. The junction of these two lines represents the center of the clinical crown.

Ideally, a shape of the orthodontic bracket's tooth facing surface is the replica of the center of the clinical crown. For perfect orthodontic treatment, the center of the bracket must coincide with the center of the clinical crown, the vertical long axis of the bracket must coincide with the vertical ridge line of the clinical crown, and the horizontal bracket slot line should match the horizontal contact point line of the clinical crown.

The crown angle is the angle formed between the vertical ridge or the vertical long axis of the crown and the horizontal plane or line formed by lines joining the contact points of all teeth. Each tooth has its own crown angulation. The crown angulation to the horizontal plane must be replicated by the bracket manufacturer of each tooth. Each bracket must have its own specific angulation so that one bracket cannot be switched to replace another bracket. Using present methods, it is difficult to properly align and position the brackets since each bracket has a different angulation that must be matched with the structures of the tooth.

The correct positioning of each orthodontic bracket can include movement in any 3 planes of motion (X, Y, Z planes) called the tip, torque and rotational movements. This type of movement is achieved by the values that are built-in to each bracket, which are known as the bracket prescription values. The correct positioning of each orthodontic bracket requires knowledge of tooth structure, as discussed above, as well as a clear view of the tooth and bracket during positioning.

Thus, an orthodontic bracket positioning instrument solving the aforementioned problems is desired.

SUMMARY

The orthodontic bracket positioning instrument is designed to engage an orthodontic bracket for precisely positioning a center of an orthodontic bracket on a center of the crown while maintaining an open visual field of the bracket and relevant structures of the tooth. The positioning instrument includes a key that is configured to mate with a receiving aperture formed in the bracket. A proximal side of the key is supported by a base that extends along a length of the key. An alignment notch is defined within a proximal side of the base to indicate the center of the bracket, as well as the horizontal axis of the bracket. A handle extends proximally from the proximal side of the base. The handle may extend from the base at an angle to provide a clear line of sight to the base, the bracket, and supporting tooth.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
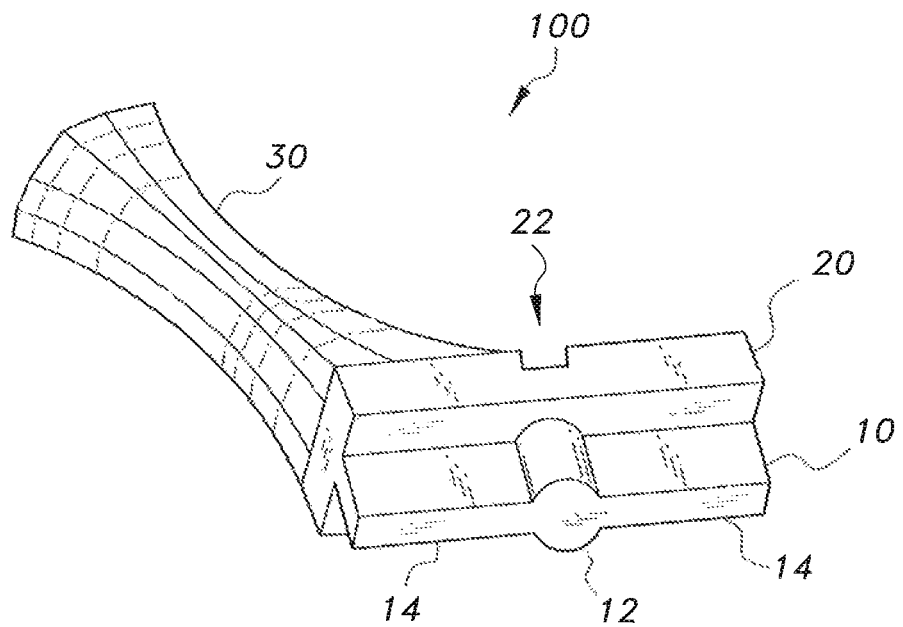
FIG. 1 is a perspective view of an embodiment of the orthodontic bracket positioning instrument.

FIG. 1 shows an embodiment of the orthodontic bracket positioning instrument 100 for positioning an orthodontic bracket at the center of a crown, or the point of greatest convexity of the crown. The distal end of the instrument 100 includes a key 10 that is sized and shaped to mate with a receiving aperture 212 in an orthodontic bracket, for example the orthodontic bracket 200 shown in FIG. 4, for precisely adjusting a position of the bracket 200 on a tooth. The key 10 may include a rounded central portion 12, which corresponds to a center of the bracket 200, and two linear wings 14, which correspond to a vertical axis of the bracket 200 mated therewith. A proximal side of the key 10 may be attached to a base 20. In an embodiment, the base 20 may be generally rectangular. The base 20 may include a proximal face, a distal face, a length, a width, and an alignment notch extending across a width of the proximal face.

Figure 2:
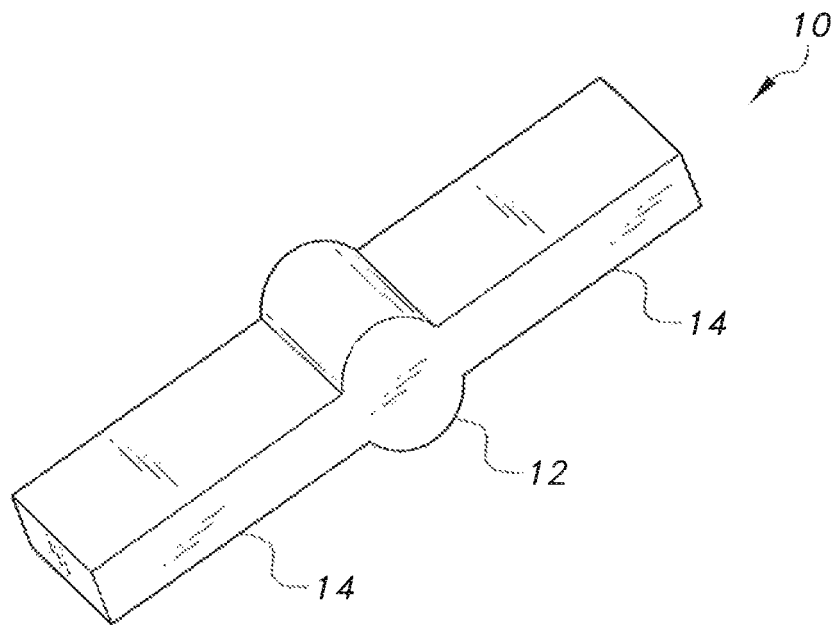
FIG. 2 is a perspective view of a key of the orthodontic bracket positioning instrument removed that has been removed from the base.

As shown in FIG. 2, the center of the key 10 may include a rounded central portion 12 which may mate with a corresponding rounded, central portion of the receiving aperture 212 on the bracket 200. Two diametrically opposed wings 14 may extend out from opposing sides of the rounded central portion 12. The wings 14 may mate with corresponding linear portions of the receiving aperture 212 that are aligned with a vertical axis of the bracket 200.

Figure 3:
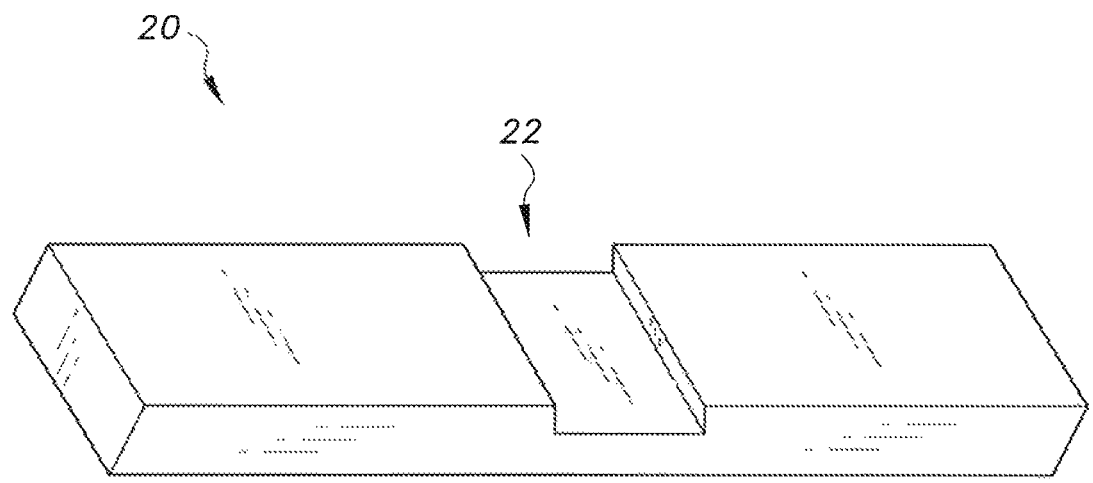
FIG. 3 is a perspective view of a base of the orthodontic bracket positioning instrument with the key and handle removed.

FIG. 3 shows an embodiment of a base 20 removed from the key 10 and handle 30. The base 20 may generally be in the form of a rectangular cuboid. The alignment notch 22 may extend across a central portion of the base 20.

Figure 4:
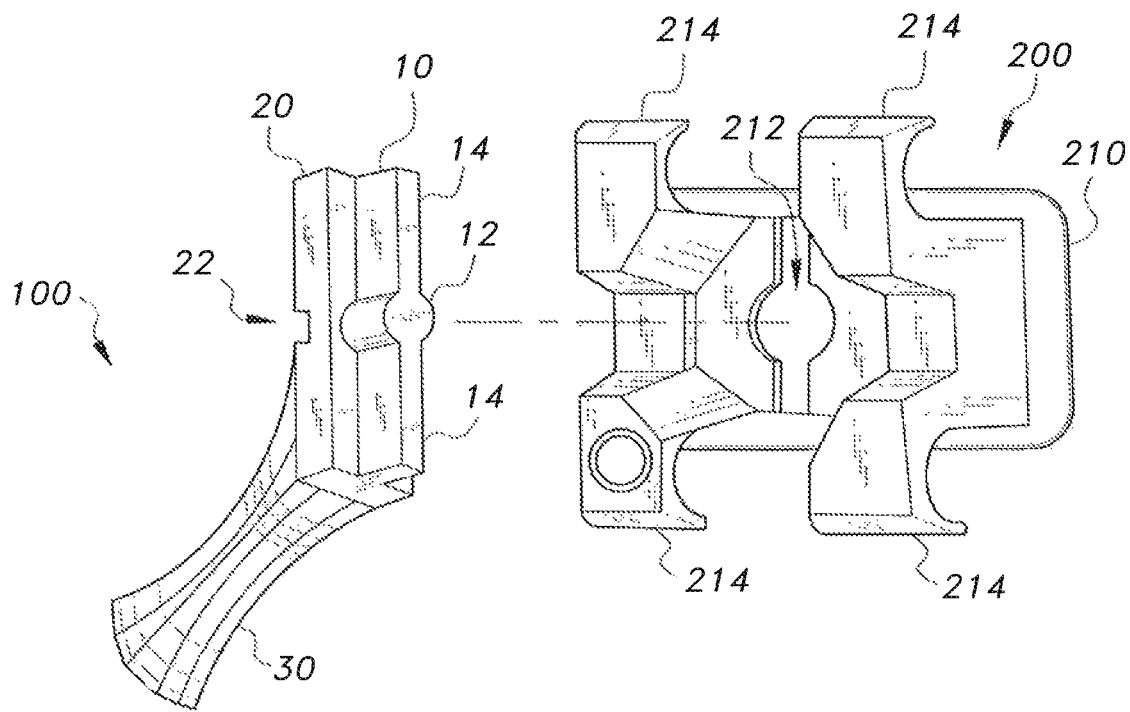
FIG. 4 is a perspective view of a system for correcting teeth alignment including the orthodontic bracket positioning instrument and an associated orthodontic bracket.

FIG. 4 shows the positioning instrument 100 and an orthodontic bracket 200 that is configured for receiving the positioning instrument 100. The bracket 200 may include a generally rectangular body 210 having a receiving aperture 212 defined within a central portion thereof and tie-wings 214 protruding from corners of the bracket 200. The receiving aperture 212 may include a rounded central portion for receiving the central portion 12 of the key and two diametrically opposed linear channels extending from opposing sides of the rounded central portion for receiving the wings 14 of the key. The linear channels may be aligned with a vertical axis of the bracket 20. The key 10 on the positioning instrument may be sized and shaped to fit securely within the receiving aperture 212 to ensure any movement of the instrument 100 is directly translated to movement of the bracket 200. For example, rotating the key 10 can rotate and position the bracket 200 as desired.

The alignment notch 22 is aligned with the rounded portion of the key and can be used to indicate the position of the rounded portion of the key to a user while inserting the key into the receiving aperture 212. Once mated with the bracket 200, the alignment notch may correspond to a center of the bracket 200. Additionally, the alignment notch 22 may indicate a horizontal axis of the bracket 200 when the instrument 100 is mated with the bucket 200. Accordingly, when a practitioner is positioning a bracket 200 using the positioning instrument 100, the center of the bracket 200 corresponding with the rounded portion of the aperture can be easily determined by the alignment notch 22. It should be understood that the base can include a laser mark or other marking on the surface of the base instead of a notch defined within the surface.

Figure 5:
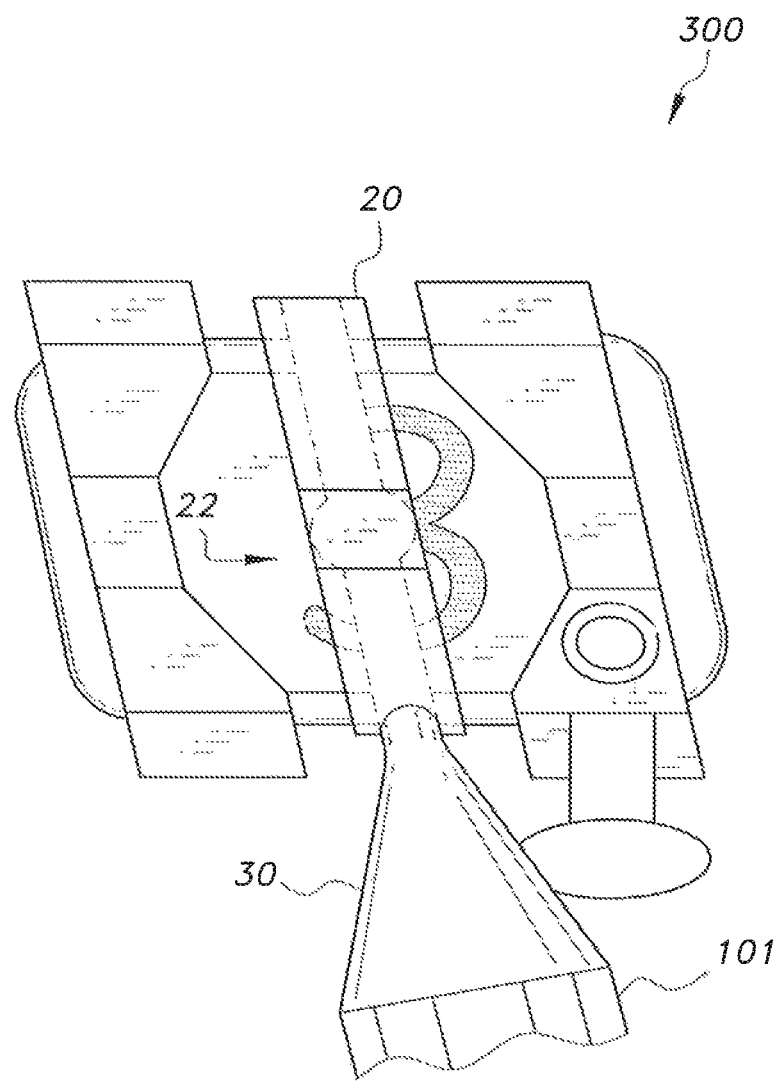
FIG. 5 is a labial view of the orthodontic bracket positioning instrument attached to an orthodontic bracket having a rhomboid shape.

It should he understood that the rectangular bracket 200 shown in FIG. 4 is exemplary and that the positioning instrument 10 can he mated with other types of brackets. For example, as shown in FIG. 5, the positioning instrument 10 can he mated with a bracket 300 that has a rhomboid shape. Similar to the embodiment discussed in FIG. 4, the alignment notch 22 may facilitate positioning the rounded portion of the key into the rounded portion of the receiving aperture 212. The positioning instrument can be made of plastic, stainless steel, or other suitable material.

Figure 6A:
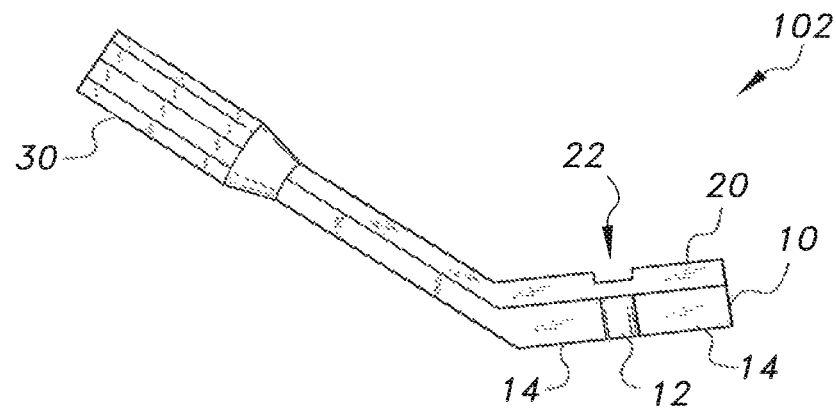
FIG. 6A is a side view of a second embodiment of an orthodontic bracket positioning instrument.
Figure 6B:
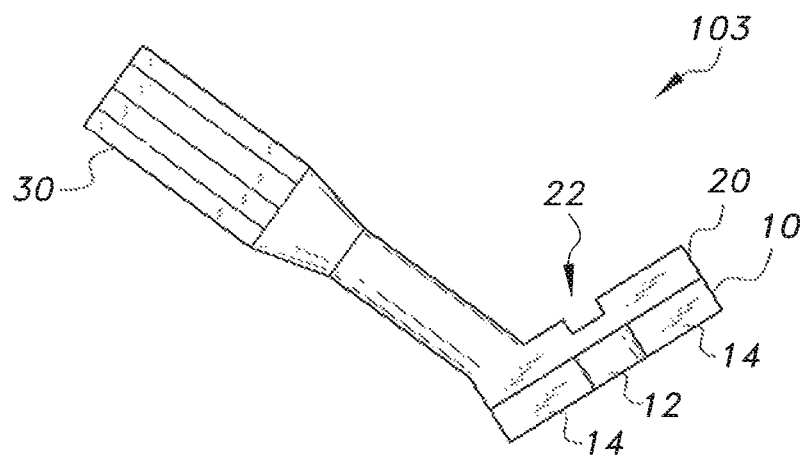
FIG. 6B is a side view of a third embodiment of an orthodontic bracket positioning instrument.
Figure 6C:
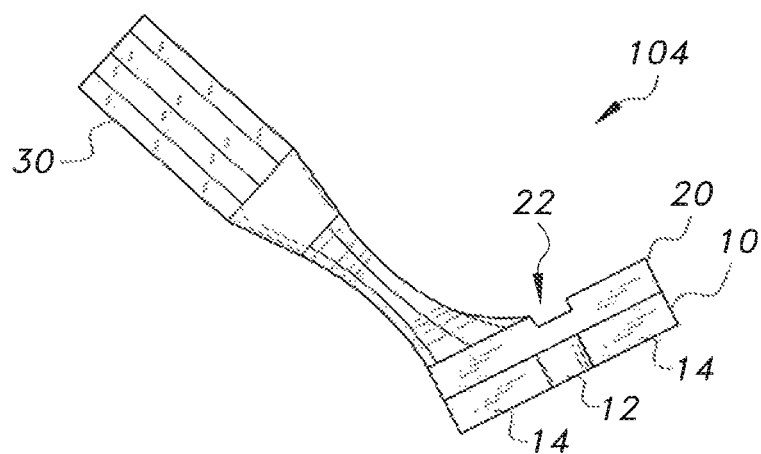
FIG. 6C is a side view of a third embodiment of an orthodontic bracket positioning instrument.

FIGS. 6A-6C show embodiments of the positioning instruments 102, 103, 104 having different handle configurations. As seen in each of FIGS. 6A-6C, the handles 30 may extend away from the base 20 at an angle to provide a clear line of sight to the alignment notch 22 on the base 20. In an embodiment, the handle 30 can form an angle that is greater than 90 degrees, e.g., 135 degrees, with the base. As discussed above, this can allow a practitioner to more easily position the bracket 20 on the tooth. The handle 30 can have an upper gripping portion, a generally frustoconical mid-portion, and a lower connecting portion. A lower half of the lower connecting portion and the key can be formed from one piece and an upper half of the lower connecting portion and the base can be formed from one piece, as shown in FIG. 6A. Alternatively, the key can be formed from a separate piece, as shown in FIGS. 6B and 6C, The lower connecting portion can be generally rectangular as shown in FIGS. 6A and 6B or curved, as shown in FIG. 6C.

A method of using the positioning instrument 100 to position an orthodontic bracket 200 on a tooth may include determining an intersection of a vertical ridge line of the tooth's crown and the horizontal line of the tooth crown that extends between mesial and distal contacts points of the crown with adjacent teeth. The bracket 200 may initially be temporarily attached to the tooth by the bonding force of uncured adhesive at a generally central location. The key 10 of the positioning instrument 100 may then be mated with the receiving aperture 212 of the bracket 200. The practitioner may then use the positioning instrument 100 to align the center of the bracket 200 with the intersection of the determined vertical ridge line and horizontal line of the tooth's crown using the alignment notch 22 as an indicator of the center of the bracket. Once the bracket 200 is centered, the practitioner may use the positioning instrument 100 to align the horizontal axis of the bracket 200 with the determined horizontal line of the tooth using the length of the alignment notch 22 as a guide. The practitioner may also use the positioning instrument 100 to align the vertical axis of the bracket with the determined vertical ridge of the tooth. Once the bracket is properly positioned, the practitioner may press the bracket 200 against the tooth with the positioning instrument 100 to squeeze out the adhesive between the bracket 200 and tooth.

It is to be understood that the orthodontic bracket positioning instrument is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system for correcting teeth alignment, comprising:
an orthodontic bracket positioning instrument, the orthodontic bracket positioning instrument consisting of:
an elongate base having a proximal face, a distal face, a length, a width, and an alignment notch extending across the width of the proximal face;
a key projecting from the distal face of the base, the key including a rounded central portion and two diametrically opposed wings extending from opposing sides of the rounded central portion, the rounded central portion being aligned with the alignment notch of the base; and
a handle extending at an obtuse angle from the proximal face of the base, the handle configured to be gripped by a hand of a user; and
an orthodontic bracket having a receiving aperture with a rounded central portion at a center of the bracket and two diametrically opposed linear wings extending from opposing sides of the rounded central portion, the wings being aligned with a vertical axis of the bracket,
an archwire slot extending in a mesial-distal direction across the bracket and being disposed between the linear wings of the bracket,
wherein the key of the positioning instrument fits within the receiving aperture of the bracket and the alignment notch is configured to be in alignment a horizontal axis of the bracket once the bracket is mated with the key and a length of the base is oriented to align with a vertical axis of the bracket.

2. The system of claim 1, wherein the base of the orthodontic bracket positioning instrument is rectangular and the alignment notch extends across a central portion of the base.

3. The system of claim 1, wherein the handle of the orthodontic bracket positioning instrument has an upper gripping portion, a frustoconical mid-portion, and a lower connecting portion, the lower connecting portion being connected to the base.

4. The system of claim 3, wherein the lower connecting portion is rectangular.

5. The system of claim 3, wherein the lower connecting portion is curved.

6. The system of claim 1, wherein the obtuse angle is 135 degrees.

* * * * *